US008952969B2

(12) United States Patent
Isner

(10) Patent No.: US 8,952,969 B2
(45) Date of Patent: Feb. 10, 2015

(54) TRANSFER OF MOTION BETWEEN ANIMATED CHARACTERS

(75) Inventor: Michael Isner, Santa Monica, CA (US)

(73) Assignee: AUTODESK, Inc., San Rafael, CA (US)

( * ) Notice: Subject to any disclaimer, the term of this patent is extended or adjusted under 35 U.S.C. 154(b) by 1354 days.

(21) Appl. No.: 12/220,254

(22) Filed: Jul. 22, 2008

(65) Prior Publication Data

US 2008/0303831 A1 Dec. 11, 2008

Related U.S. Application Data

(63) Continuation of application No. 11/134,653, filed on May 20, 2005, now abandoned.

(51) Int. Cl.
*G06T 13/00* (2011.01)
*G06T 13/40* (2011.01)

(52) U.S. Cl.
CPC .................................. *G06T 13/40* (2013.01)
USPC ........................................................ 345/474

(58) Field of Classification Search
None
See application file for complete search history.

(56) References Cited

U.S. PATENT DOCUMENTS

| 5,767,861 | A | 6/1998 | Kimura | |
|---|---|---|---|---|
| 5,852,450 | A * | 12/1998 | Thingvold | 345/473 |
| 5,966,141 | A | 10/1999 | Ito et al. | |
| 6,166,746 | A | 12/2000 | Inada et al. | |
| 6,203,425 | B1 | 3/2001 | Hayashi | |
| 6,215,496 | B1 | 4/2001 | Szeliski et al. | |
| 6,326,972 | B1 * | 12/2001 | Buhler et al. | 345/474 |
| 6,377,281 | B1 | 4/2002 | Rosenbluth et al. | |
| 6,503,144 | B1 | 1/2003 | Rimoto et al. | |
| 6,504,541 | B1 * | 1/2003 | Liu et al. | 345/619 |
| 6,504,546 | B1 * | 1/2003 | Cosatto et al. | 345/473 |
| 6,522,332 | B1 | 2/2003 | Lanciault et al. | |
| 6,535,215 | B1 | 3/2003 | Dewitt et al. | |
| 6,552,729 | B1 * | 4/2003 | Di Bernardo et al. | 345/473 |
| 6,626,759 | B1 | 9/2003 | Matsuoka | |
| 6,697,071 | B2 | 2/2004 | Iino et al. | |
| 6,888,549 | B2 * | 5/2005 | Bregler et al. | 345/474 |

(Continued)

FOREIGN PATENT DOCUMENTS

| JP | 09-330424 | 6/1996 |
|---|---|---|
| JP | 11-185055 | 12/1997 |

OTHER PUBLICATIONS

Monzani et al. ("Using an Intermediate Skeleton and Inverse Kinematics for Motion Retargeting"), Eurographics 2000, pp. 2, 6, and 9.*

(Continued)

*Primary Examiner* — Daniel Hajnik
*Assistant Examiner* — Andrew G Yang
(74) *Attorney, Agent, or Firm* — Patterson & Sheridan, LLP

(57) ABSTRACT

Motion may be transferred between portions of two characters if those portions have a minimum topological similarity. The elements of the topology that are similar are referred to as basic elements. To transfer motion between the source and target characters, the motion associated with the basic elements of the source character is determined. This motion is retargetted to the basic elements of the target character. The retargetted motion is then attached to the basic elements of the target character. As a result, the animation of the basic elements in the topology of the target character effectively animates the target character with motion that is similar to that of the source character.

18 Claims, 3 Drawing Sheets

(56) References Cited

U.S. PATENT DOCUMENTS

| | | | |
|---|---|---|---|
| 6,976,918 | B2 | 12/2005 | Hosokawa |
| 7,012,608 | B1 | 3/2006 | Fujisaki |
| 7,068,277 | B2 * | 6/2006 | Menache ............... 345/473 |
| 7,102,647 | B2 | 9/2006 | Sloan et al. |
| 7,104,890 | B2 | 9/2006 | Tsuda et al. |
| 7,106,334 | B2 | 9/2006 | Imagawa et al. |
| 7,126,607 | B2 | 10/2006 | Emerson |
| 7,168,953 | B1 | 1/2007 | Poggio et al. |
| 7,221,380 | B2 | 5/2007 | Hunter et al. |
| 7,225,129 | B2 * | 5/2007 | Massaro et al. ............ 704/261 |
| 7,251,593 | B2 | 7/2007 | Dariush et al. |
| 7,253,817 | B1 | 8/2007 | Plantec et al. |
| 7,493,243 | B2 | 2/2009 | Choi et al. |
| 7,515,155 | B2 | 4/2009 | Anderson et al. |
| 2001/0004262 | A1 | 6/2001 | Mochizuki |
| 2002/0050997 | A1 | 5/2002 | Iino et al. |
| 2002/0067363 | A1 | 6/2002 | Ohto et al. |
| 2003/0164829 | A1 | 9/2003 | Bregler et al. |
| 2003/0193503 | A1 | 10/2003 | Seminatore et al. |
| 2004/0001064 | A1 | 1/2004 | Boyd et al. |
| 2004/0012594 | A1 * | 1/2004 | Gauthier et al. ............ 345/473 |
| 2004/0036689 | A1 | 2/2004 | Chiu |
| 2004/0160445 | A1 | 8/2004 | Whatmough |
| 2004/0179013 | A1 * | 9/2004 | Menache ............... 345/473 |
| 2006/0061574 | A1 | 3/2006 | Ng-Thow-Hing et al. |
| 2006/0139355 | A1 | 6/2006 | Tak et al. |
| 2006/0181535 | A1 | 8/2006 | Watt |
| 2006/0274070 | A1 | 12/2006 | Herman et al. |
| 2007/0030266 | A1 | 2/2007 | Styles |

OTHER PUBLICATIONS

Huang et al. ("Interactive Visual Method for Motion and Model Reuse"), ACM, 2003, pp. 30 and 35.*

English Translation of JP 11-185055.

English Translation of JP 09-330424.

Motobayashi et al. "Assimilated Motion Generation for Characters with Various Features," Journal of Institute of Electronics, Information and Communication Engineers, Information and System II—Pattern Processing, Japan, Jul. 1, 2004, vol. J87-D-II, No. 7, pp. 1473-1486.

English Abstract of "Motobayashi et al." (Provided as explanation of relevance).

Yukawa et al. "Human Motion Description System Using BUYO-FU," Journal of Information Processing Society of Japan, Japan, Information Processing Society of Japan, Oct. 15, 2000, vol. 41, No. 10, pp. 2873-2880.

English abstract of "Yukawa et al." (provided as explanation of relevance).

James, et al. "Skinning Mesh Animations," SIGGRAPH '05: ACM SIGGRAPH 2005 Papers, pp. 399-407.

Mohr, et al. "Building Efficient, Accurate Character Skins From Examples," ACM Transactions on Graphics, vol. 22, No. 3, Jul. 2003, pp. 562-568.

Gleicher, Michael. "Retargetting Motion to New Characters," Proceedings of SIGGRAPH 98, pp. 33-42, Jul. 1998.

Florian Loitsch, "Maya File Translator," 2004. http://florian. Loitsch. com/gpExport/oldDocs/report.html.

Antony Ward, "Game Character Development with Maya", 2004, New Riders.

Office Action. U.S. Appl. No. 11/496,241 dtd. Sep. 2, 2009.

Office Action, U.S. Appl. No. 11/496,241, dated Apr. 14, 2010.

Sumner, et al. "Deformation Transfer for Triangle Meshes," ACM Trans. Graph. 23, (Aug. 3, 2004), pp. 399-405.

Office Action, U.S. Appl. No. 12/291,163 dated Jun. 28, 2011.

* cited by examiner

TRANSFER OF MOTION BETWEEN ANIMATED CHARACTERS

CROSS-REFERENCE TO RELATED APPLICATION

This application claims priority to and the benefit of, under 35 U.S.C. §120, and is a continuation application of application Ser. No. 11/134,653, filed on May 20, 2005 now abandoned, and is pending.

BACKGROUND

In computer animation, a character generally is defined by a topology, often called a skeleton, and an associated geometry, often called a skin or envelope. The topology includes a number of interconnected elements. Each element in the topology is defined in three dimensions by a position and orientation, which may include direction and rotation. Various algorithms control the relationship between the topology and the geometry to produce the look of a character.

Various techniques may be used to manipulate a character to provide the appearance of animation. Generally, such techniques involve associating one or more animation controls with one or more elements of the topology in a process called rigging. One technique is to specify a series of key frames that describe motion of the character over time, using a combination of inverse and forward kinematics and character rigging techniques. Another technique is to use motion capture data representing the position and orientation of selected elements of the topology of a character over time. For example, motion may be captured using sensors attached to a live actor. The motion capture data may be used to derive the topology of a character representing the live actor. The motion capture data then is used to animate that character. Other techniques include using constraints, scripts or expressions.

Motion capture data for one character may be reused with another character using a process called motion retargetting. Motion retargetting algorithms generally require that the source character and target character have identical structures, or that the target character has a simpler structure than the source character. With these constraints, motion retargetting can be performed between characters having the same structure but different proportions. See, for example, "Retargetting Motion to New Characters," by Michael Gleicher, in *Proceedings of SIGGRAPH* 98, pages 33-42, July 1998. In practice, motion retargetting is restricted to retargetting motion capture data to pre-defined rig structures, and in limited cases moving animations from one pre-defined rig to another, due to the narrow constraints of current methods.

SUMMARY

In practice, it would be desirable to transfer motion from one character to another character of an arbitrarily different topology. It also would be desirable to transfer motion in such a way that an animator can use animation controls in a familiar manner, instead of requiring the animator to manipulate dense motion data.

Motion can be transferred between characters of different topologies if those characters have a minimum topological similarity. Motion also may be transferred between portions of two characters if those portions have a minimum topological similarity. In particular, motion can be transferred from a source character to a target character if a subset of elements of the topology of the source character is homotopic with a subset of the elements of the topology of the target character.

The elements of the topology that form these subsets are called herein "basic elements." All characters having such homotopic subsets among them may be considered a class of characters. In other words, all characters having the same set of basic elements are in the same class of characters. An example class of characters is biped characters.

To transfer motion between the source and target characters, the motion associated with the basic elements of the source character is determined. This motion is retargetted to the basic elements of the target character. The retargetted motion is then attached to the basic elements of the target character. As a result, the animation of the basic elements in the topology of the target character effectively animates the target character with motion that is similar to that of the source character.

Ideally, the basic elements of the target character also are associated with animation controls that control the animation of the target character. For example, a character may be rigged such that hip and chest elements control the animation of elements in a spine connected between the hip and the chest. If the hip and chest elements also are the basic elements of the target character, then motion transferred from the corresponding hip and chest elements of the source character can be used to animate the elements of the spine of the target character.

In one embodiment of retargetting, a set of vector maps is defined to represent the orientations of the basic elements of the characters. One vector map represents the basic elements of the source character. Another vector map represents the basic elements of the target character. Yet another vector map can be used to represent a set of basic elements of a canonical topology in a default orientation. The vector map representing this set of canonical basic elements may be understood as defining a canonical topology, and the default orientation may be understood as a reference pose.

Because the frames of reference of the source and target characters and the canonical reference pose may be different, transformations among these frames of reference are computed. In one embodiment, the source character and the target character are placed in the same pose as the canonical reference pose by the user through a graphical user interface. A transformation between the frames of reference of the source and target characters is determined. The motion of the basic elements of the source character is retargetted to the basic elements of the target character using this transformation and the vector maps representing the set of basic elements of source and target characters. Alternatively, a transformation between the frame of reference for the source character and the frame of reference of the canonical reference pose may be computed. This transformation may be stored with the source character. The motion of the basic elements of the source character is retargetted to the canonical reference pose using this transformation and the vector maps representing the set of basic elements of the source character and the canonical reference pose. In this embodiment, the result is a normalized representation of the motion of the basic elements of the source character. This normalized motion can be stored, along with a representation of the canonical reference pose to which it corresponds, thus providing the capability of building a library or database of motion for different classes of characters which can be reused for many different target characters. Another transformation between the frame of reference of a target character of the same class and the frame of reference of the canonical reference pose is computed. This transformation can be stored with the target character. Given a set of source characters and target characters of the same class, these transformations normalize orientations across the class of characters. Stored normalized motion then can be retargetted to the basic elements of the target character using this transformation and the vector maps representing the set of basic elements of the target character and the canonical reference pose.

DETAILED DESCRIPTION

Figure 1:
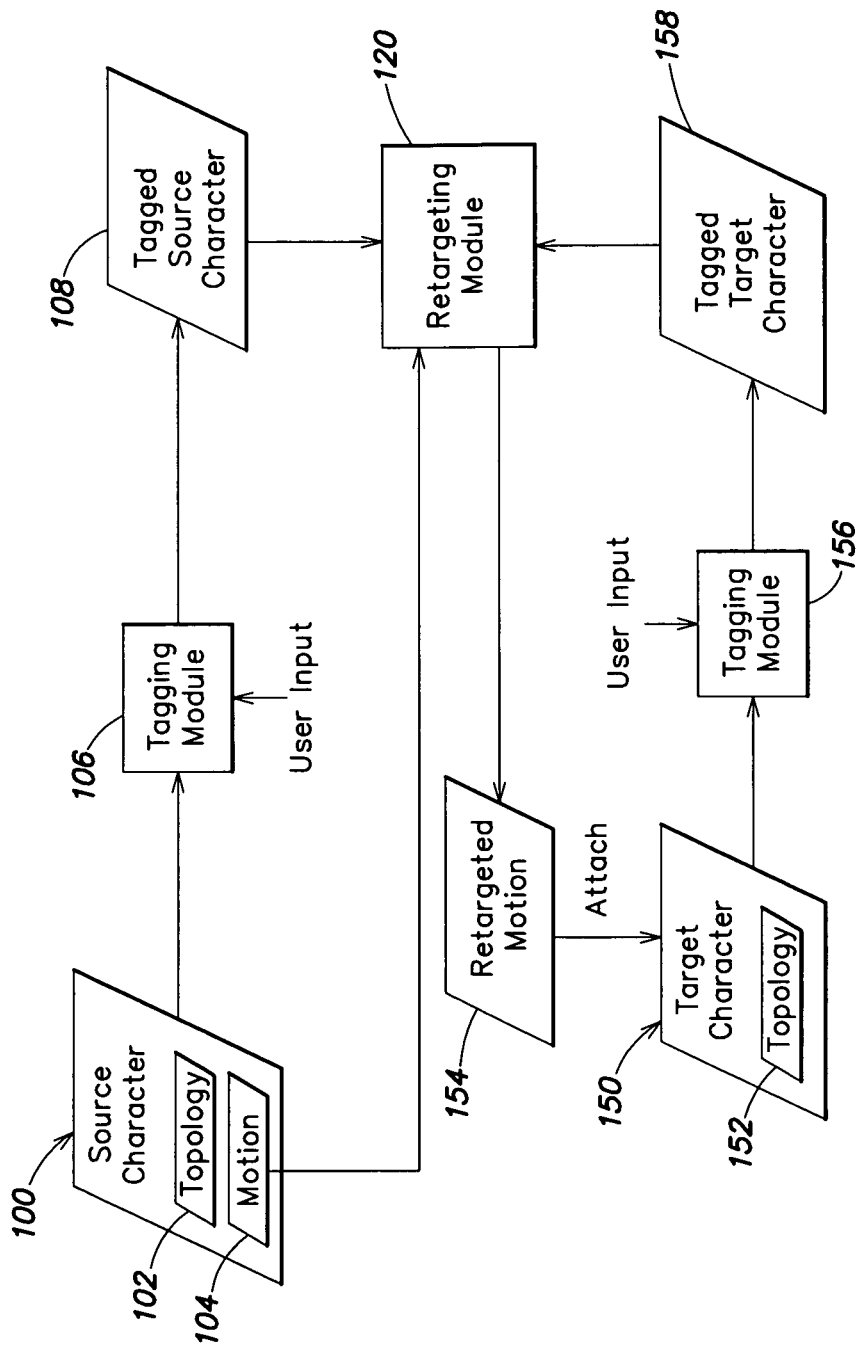
FIG. 1 is a data flow diagram of an embodiment of a system for transferring motion from a source character to a target character.

Referring now to FIG. 1, a source character 100 is defined by a topology 102 and an associated geometry. Various algorithms control the relationship between the topology and the geometry to produce the look of a character. Similarly, a target character 150 is defined by a topology 152 and an associated geometry.

Various techniques may have been used to define motion for the source character. Generally, such techniques involve associating one or more animation controls with one or more elements of the topology in a process called rigging. One technique is to specify a series of key frames that describe motion of the character over time, using a combination of inverse and forward kinematics and character rigging techniques. Another technique is to use motion capture data representing the position and orientation of selected elements of the topology of a character over time. For example, motion may be captured using sensors attached to a live actor. The motion capture data may be used to derive the topology of a character representing the live actor. The motion capture data then is used to animate that character. Other techniques include using constraints, scripts or expressions. The target character also may be rigged in a manner that will improve its ability to be animated through motion transferred from the source character.

Motion 104 that is defined for a source character can be transferred from the source character 100 to a target character 150, even if they have different topologies, if these characters have a minimum topological similarity. Motion also may be transferred between a portion of a source character and a portion of the target character, if these portions have a minimum topological similarity. In particular, motion can be transferred from a source character to a target character if a subset of elements of the topology of the source character is homotopic with a subset of the elements of the topology of the target character. The elements of the topology that form these subsets are called herein "basic elements." All characters having such homotopic subsets among them may be considered a class of characters. In other words, all characters having the same set of basic elements are in the same class of characters. An example class of characters is biped characters. Two different biped characters may have, on the surface, very different topologies; but, these characters each may have the same primary skeletal elements. For example, any biped likely has elements representing a head, neck, chest, arms, spine, hips and legs. Motion can be transferred to the elements in a target topology that match elements in the source topology.

In one embodiment, the user may identify the basic elements of the source and target characters through a textual or graphical user interface. In particular, the topology of each character is tagged, by tagging modules 106, 156 in response to user input, to indicate which elements are the basic elements, to provide tagged characters 108, 158. For example, a user interface may be provided to permit a user to select an element of a topology of a character and to associate a name with it. Elements with the same name in different topologies can be deemed to be corresponding elements for the purposes of motion transfer.

Ideally, the basic elements of the target character also are associated with animation controls that control the animation of the target character. For example, a character may be rigged such that the hip and chest elements control the animation of elements in a spine connected between the hip and the chest. If the hip and chest elements also are the basic elements of the target character, then motion transferred from the corresponding hip and chest elements of the source character can be used to animate the elements of the spine of the target character.

To transfer motion between the source and target characters, the motion 104 associated with the basic elements of the source character is determined. In particular, the motion data (i.e., the position and orientation for each frame of the animation) for each basic element of the source character is derived from the animation controls, motion capture data and any other information used to animate the character.

Using the basic elements as identified by the tagged source character 108 and the tagged target character 158 and the motion 104, a retargetting module 120 retargets motion 104 to obtain retargetted motion 154. For example, conventional motion retargetting techniques can be used to retarget the motion of the set of basic elements of the source character to its corresponding set of basic elements of the target character. A particular embodiment of retargetting is described in more detail below. Motion 104 associated with the basic elements of the source character is retargetted on a frame by frame basis to the basic elements of the target character.

The retargetted motion 154 is then attached to the basic elements of target character 150. As a result, the animation of the basic elements in the topology of the target character animates the target character with motion that is similar to that of the source character. To the extent that the basic elements of the target character are associated with animation controls for manipulating other parts of the target character topology, more usable motion transfer can be achieved.

Figure 2:
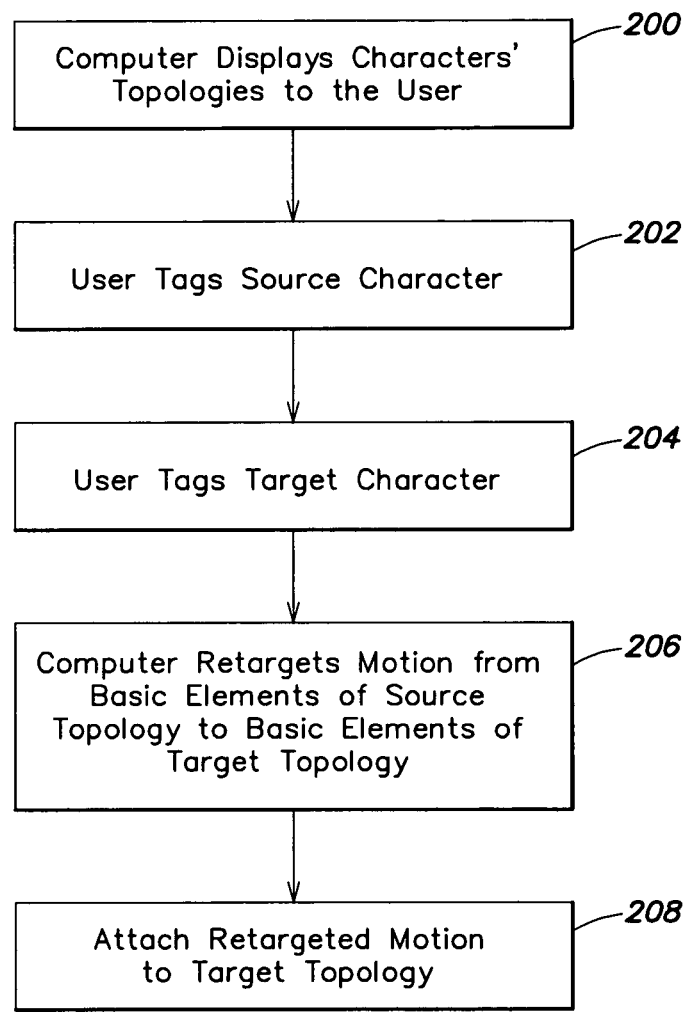
FIG. 2 is a flow chart describing an embodiment of a workflow for transferring motion from a source character to a target character.

Referring now to FIG. 2, a flow chart describing one embodiment of a workflow using a system as shown in FIG. 1 will now be described.

Given a source character and a target character, the topologies of these characters is displayed (200) to the user. The user indicates what elements in the source and target characters correspond to each other. This indication may be provided by tagging the basic elements in the source character (202) and in the target character (204), by providing user input to the tagging module as described above. After both the target and the source characters are tagged, the computer retargets (206) the motion from the basic elements of the source character to the basic elements of the target character. After the motion is retargetted, the retargetted motion is attached (208) to the target character.

Figure 3:
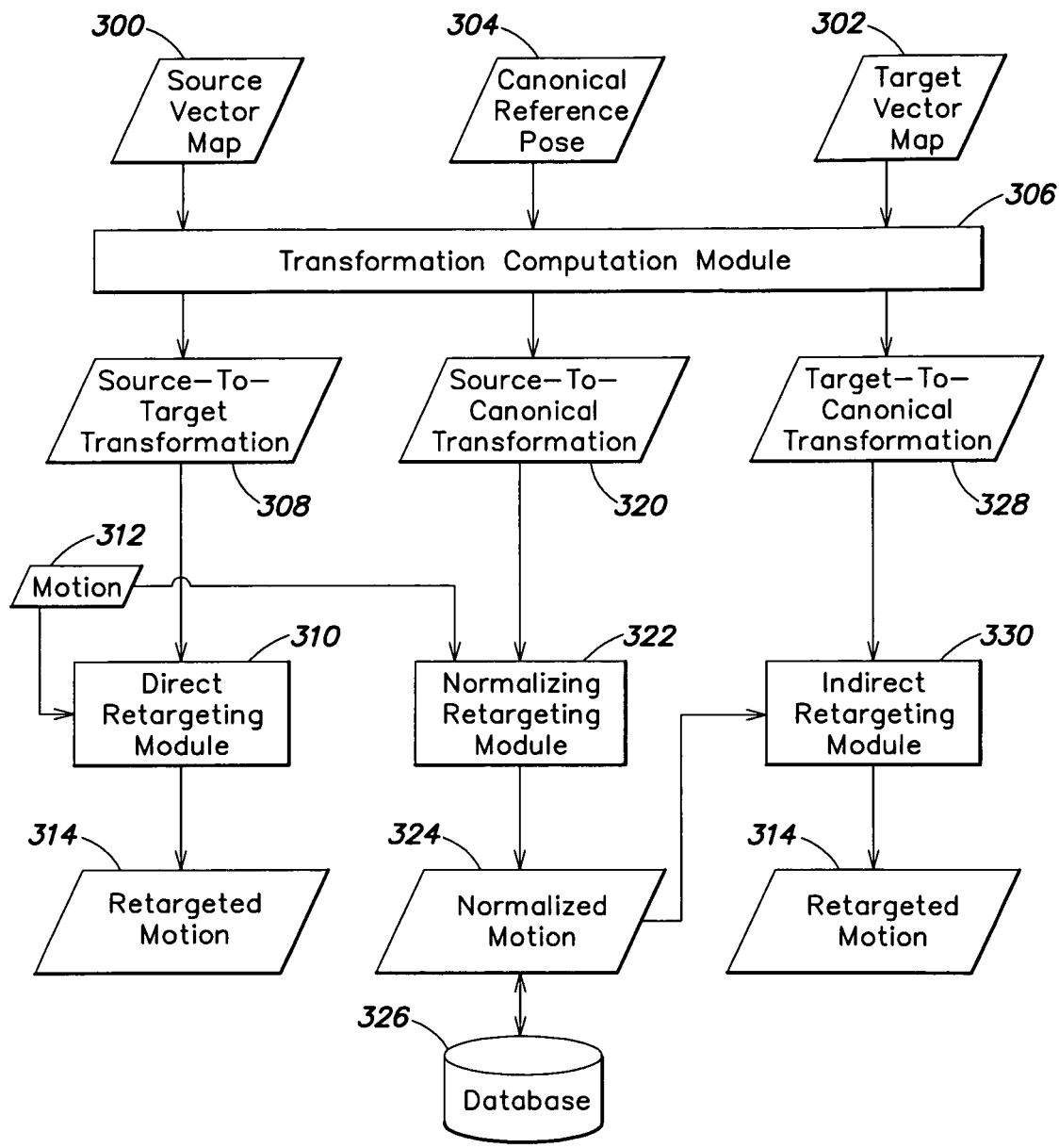
FIG. 3 is a data flow diagram describing an embodiment of retargetting motion.

Referring now to FIG. 3, one embodiment of retargetting will now be described. A set of vector maps is defined to represent the orientations of the basic elements of the characters. One vector map 300 represents the basic elements of the source character. Another vector map 302 represents the basic elements of the target character. Yet another vector map 304 can be used to represent a set of basic elements of a canonical topology in a default orientation. The vector map representing this set of canonical basic elements may be understood as defining a canonical topology, and the default orientation may be understood as a reference pose. Because the frames of reference of the source and target characters and the canonical reference pose may be different, transformations among these frames of reference are computed.

In one embodiment, the source character and the target character are placed in the same pose by the user through a graphical user interface. A source-to-target transformation 308 between the frames of reference of the source and target characters is computed by a transformation computation module 306 given these known orientations of the source and target characters. The direct retargetting module 310 retargets the motion 312 of the basic elements of the source character to the basic elements of the target character using this transformation and the vector maps representing the set of basic elements of the source and target characters, resulting in retargetted motion 314.

Alternatively, the source character is placed in the same pose as the reference pose for the canonical topology, by the user through a graphical user interface. A source-to-canonical transformation 320 between the frame of reference of the source character and the frame of reference for the canonical topology may be computed. This transformation may be stored with the source character. The normalizing retargetting module 322 retargets the motion 312 of the basic elements of the source character to the canonical topology using this transformation 320 and the vector maps representing the set of basic elements of the source character and the canonical topology.

In this embodiment, the result is a normalized representation of the motion 324 of the basic elements of the source character. This normalized motion can be stored along with a representation of the canonical topology to which it corresponds, for example in database 326. The database 326 thus may provide the capability of building a library or database of motion for different classes of characters which can be reused for many different target characters. Such a database could be used, for example, by selecting a normalized motion and by matching elements of the topology of the target character to the canonical topology associated with the selected normalized motion. The database also could be searched by matching selected elements of a target character to canonical reference poses referenced in the database to identify motions corresponding to the selected elements of the target character.

For any target character having a subset of elements that is homotopic with a subset of elements of the canonical topology, the normalized motion can be transferred from the canonical topology to the target character. The target character is placed in the same pose as the reference pose for the canonical topology, by the user through a graphical user interface. A target-to-canonical transformation 328 between the frame of reference of a target character and frame of reference of the canonical topology is computed. This transformation may be stored with the target character. Given a set of source characters and target characters of the same class, these transformations normalize orientations across the class of characters. An indirect retargetting module 330 receives stored normalized motion 324 and retargets it from the canonical topology to the basic elements of the target character using transformation 328 and the vector maps representing the set of basic elements of the target character and the canonical topology, resulting in retargetted motion 314.

In these embodiments, if the transformations among the various frames of reference are known, they need not be computed.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The components shown in FIG. 1 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for transferring motion from a source character having a source topology to a target character having a target topology, comprising:

receiving a user input that identifies basic elements in the source topology and basic elements in the target topology, wherein the source topology is arbitrarily different than the target topology, the basic elements in the source topology comprise a subset of elements in the source topology, the basic elements in the target topology comprise a subset of elements in the target topology, and the basic elements in the source topology are homotopic with the basic elements in the target topology;

computing a source-to-canonical transformation between a frame of reference of the source topology and a frame of reference of a canonical topology, wherein the frame of reference of the source topology and the frame of reference of the canonical topology are different;

retargetting motion from the basic elements of the source topology to the canonical topology using the source-to-canonical transformation to produce a normalized representation of the motion of the basic elements of the source topology;

computing a target-to-canonical transformation between a frame of reference of the target topology and the frame of reference of the canonical topology, wherein the frame of reference of the target topology and the frame of reference of the canonical topology are different;

retargeting the normalized representation of the motion of the basic elements of the source topology to the target topology using the target-to-canonical transformation to produce retargeted motion of the basic elements of the target topology;

storing in a memory a representation of the target topology with the attached retargeted motion of the basic elements of the target topology; and storing in the memory the normalized representation of the motion and the canonical topology in a database of motion for reuse with different target characters.

2. The computer-implemented method of claim 1, further comprising storing the source-to-canonical transformation with the source character.

3. The computer-implemented method of claim 1, further comprising storing the target-to-canonical transformation with the target character.

4. The computer-implemented method of claim 1, wherein the source topology and the canonical topology are placed in the same pose to compute the source-to-canonical transformation.

5. The computer-implemented method of claim 1, wherein the target topology and the canonical topology are placed in the same pose to compute the target-to-canonical transformation.

6. The computer-implemented method of claim 1, further comprising:

computing a source-to-target transformation between a frame of reference of the source topology and the frame of reference of the target topology when the source topology and the target topology are placed in the same pose; and retargetting motion from the basic elements of the source topology to the target topology using the source-to-target transformation to produce the retargeted motion of the basic elements of the target topology.

7. A non-transitory computer-readable storage medium storing instructions that, when executed by a processor, cause a computer system to transfer motion from a source character having a source topology to a target character having a target topology, by performing the steps of:

receiving user inputs identifying basic elements in the source topology and basic elements in the target topology that correspond to the basic elements in the source topology, wherein the source topology is arbitrarily different than the target topology, the basic elements in the source topology comprise a subset of elements in the source topology, the basic elements in the target topology comprise a subset of elements in the target topology, and the basic elements in the source topology are homotopic with the basic elements in the target topology;

retargetting motion from the basic elements of the source topology to the canonical topology using the source-to-canonical transformation to produce a normalized representation of the motion of the basic elements of the source topology;

computing a source-to-canonical transformation between a frame of reference of the source topology and a frame of reference of a canonical topology, wherein the frame of reference of the source topology and the frame of reference of the canonical topology are different;

computing a target-to-canonical transformation between a frame of reference of the target topology and the frame of reference of the canonical topology, wherein the frame of reference of the target topology and the frame of reference of the canonical topology are different;

retargeting the normalized representation of the motion of the basic elements of the source topology to the target topology using the target-to-canonical transformation to produce retargeted motion of the basic elements of the target topology;

storing in a memory a representation of the target topology with the attached retargeted motion of the basic elements of the target topology; and storing in the memory the normalized representation of the motion and the canonical topology in a database of motion for reuse with different target characters.

8. The computer-readable storage medium of claim 7, further comprising storing the storing the source-to-canonical transformation with the source character.

9. The computer-readable storage medium of claim 7, further comprising storing the storing the target-to-canonical transformation with the target character.

10. The computer-readable storage medium of claim 7, wherein the source topology and the canonical topology are placed in the same pose to compute the source-to-canonical transformation.

11. The computer-readable storage medium of claim 7, wherein the target topology and the canonical topology are placed in the same pose to compute the target-to-canonical transformation.

12. The computer-readable storage medium of claim 7, further comprising:

computing a source-to-target transformation between a frame of reference of the source topology and the frame of reference of the target topology when the source topology and the target topology are placed in the same pose; and retargetting motion from the basic elements of the source topology to the target topology using the source-to-target transformation to produce the retargeted motion of the basic elements of the target topology.

13. A computer system for transferring motion from a source character having a source topology to a target character having a target topology, comprising:

a processor; and a memory storing instructions that when executed by the processor are configured to cause the computer system to:

receive user inputs identifying basic elements in the source topology and basic elements in the target topology that correspond to the basic elements in the source topology, wherein the source topology is arbitrarily different than the target topology, the basic elements in the source topology comprise a subset of elements in the source topology, the basic elements in the target topology comprise a subset of elements in the target topology, and the basic elements in the source topology are homotopic with the basic elements in the target topology;

retarget motion from the basic elements of the source topology to the canonical topology using the source-to-canonical transformation to produce a normalized representation of the motion of the basic elements of the source topology, compute a source-to-canonical transformation between a frame of reference of the source topology and a frame of reference of a canonical topology, wherein the frame of reference of the source topology and the frame of reference of the canonical topology are different;

compute a target-to-canonical transformation between a frame of reference of the target topology and the frame of reference of the canonical topology, wherein the frame of reference of the target topology and the frame of reference of the canonical topology are different;

retarget the normalized representation of the motion of the basic elements of the source topology to the target topology using the target-to-canonical transformation to produce retargeted motion of the basic elements of the target topology;

store in the memory a representation of the target topology with the attached retargeted motion of the basic elements of the target topology; and store in the memory the normalized representation of the motion and the canonical topology in a database of motion for reuse with different target characters.

14. The computer system of claim 13, wherein the source-to-canonical transformation is stored with the source character.

15. The computer system of claim 13, wherein the target-to-canonical transformation is stored with the target character.

16. The computer system of claim 13, wherein the source topology and the canonical topology are placed in the same pose to compute the source-to-canonical transformation.

17. The computer system of claim 13, wherein the target topology and the canonical topology are placed in the same pose to compute the target-to-canonical transformation.

18. The computer system of claim 13, wherein the instructions that when executed by the processor are further configured to cause the computer system to:

compute a source-to-target transformation between a frame of reference of the source topology and the frame of reference of the target topology when the source topology and the target topology are placed in the same pose; and retarget motion from the basic elements of the source topology to the target topology using the source-to-target transformation to produce the retargeted motion of the basic elements of the target topology.

\* \* \* \* \*